(12) United States Patent
Alwanni et al.

(10) Patent No.: US 12,718,523 B2
(45) Date of Patent: Aug. 25, 2026

(54) COMPUTING DEVICE, SYSTEM, FRONTEND DEVICE, METHOD AND COMPUTER PROGRAM

(71) Applicant: KARL STORZ SE & Co. KG, Tuttlingen (DE)

(72) Inventors: Hisham Alwanni, Tuttlingen (DE); Antonia Stern, Tuttlingen (DE); Lars Mündermann, Tuttlingen (DE)

(73) Assignee: KARL STORZ SE & Co. KG, Tuttlingen (DE)

( * ) Notice: Subject to any disclaimer, the term of this patent is extended or adjusted under 35 U.S.C. 154(b) by 242 days.

(21) Appl. No.: 18/591,576

(22) Filed: Feb. 29, 2024

(65) Prior Publication Data

US 2024/0296654 A1 Sep. 5, 2024

(30) Foreign Application Priority Data

Mar. 3, 2023 (DE) ..................... 10 2023 105 343.4

(51) Int. Cl.
*G06V 10/00* (2022.01)
*G06V 10/762* (2022.01)
*G06V 20/70* (2022.01)

(52) U.S. Cl.
CPC ............ *G06V 10/762* (2022.01); *G06V 20/70* (2022.01)

(58) Field of Classification Search
CPC .. G06V 10/762; G06V 20/70; G06V 2201/03; G06V 10/774; G16H 30/40
See application file for complete search history.

(56) References Cited

U.S. PATENT DOCUMENTS 10,025,950 B1 7/2018 Avasarala et al.
11,003,959 B1 * 5/2021 Levner ..................... G06N 3/08
2011/0058057 A1 * 3/2011 Tokunaga ............. G06T 3/4038 348/222.1
2012/0082378 A1 * 4/2012 Peters ..................... G06F 16/55 382/165
2013/0086436 A1 * 4/2013 Antoniucci ....... H04L 12/40169 714/49
2018/0144212 A1 * 5/2018 Burgos ................. G06V 40/175
2020/0202138 A1 * 6/2020 Janakiraman ....... G06F 18/2413
(Continued)

OTHER PUBLICATIONS

Vajada, S., D. You, et al., Label the many with a few: Semi-automatic medial image modality discovery in a large image collection, 2014 IEEE Symposium on Computational Intelligence in Healthcare and E-Health, Dec. 9, 2014, pp. 167-173, IEEE, US.
(Continued)

*Primary Examiner* — Van D Huynh

(57) ABSTRACT

A computing device includes: an input interface configured to receive a plurality of images of a medical scene; an image embeddings generating module configured to receive, as its input, the plurality of images and to generate a data array as an image embedding for each image; a clustering module configured to determine a plurality of clusters within the plurality of images based on the generated image embeddings; a replacement determining module configured to determine, for each cluster of the determined plurality of clusters, a replacement image; and an output module configured to generate output data wherein, for each determined cluster, all images of that cluster are replaced with the replacement image for that cluster.

19 Claims, 5 Drawing Sheets

(56) References Cited

U.S. PATENT DOCUMENTS

| | | | | |
|---|---|---|---|---|
| 2020/0334856 | A1* | 10/2020 | Staudinger | G06V 10/776 |
| 2020/0372295 | A1* | 11/2020 | Jansen | G06N 3/09 |
| 2021/0224510 | A1* | 7/2021 | Pelkmans | G06V 10/7635 |
| 2021/0241509 | A1* | 8/2021 | Li | G06V 10/462 |
| 2021/0312589 | A1* | 10/2021 | Moriuchi | G06T 5/40 |
| 2023/0101474 | A1 | 3/2023 | Kumar et al. | |

OTHER PUBLICATIONS

Olga Rajadell Rojas, European Search Report, May 30, 2024, pp. 1-10, European Patent Office, The Hague.

German Office Action issued Apr. 30, 2024 relating to DE102023120557.9.

German Office Action issued Jan. 17, 2024 relating to DE102023105343.4.

Napravnik, Mateja [et al.]: Building radiologyNET: unsupervised annotation of a large-scale multimodal medical database. Aug. 17, 2023. URL: https://arxiv.org/pdf/2308.08517 [abgerufen am Apr. 30, 2024].

Wikipedia: Elbow method (clustering). Stand vom: 29. Jul. 2023. URL: https://en.wikipedia.org/w/index.php?title=Elbow_method_(clustering)&oldid=1167780106 [abgerufen am Apr. 30, 2024].

Birodkar, Vighnesh: Mobahi, Hossein; Bengio, Samy: Semantic Redundancies in Image-Classification Datasets: The 10% You Don't Need. Version 1,Jan. 29, 2019, URL: https://arxiv.org/abs/1901.11409 [abgerufen am Jan. 17, 2024].

Loza, A., European Search Report and Opinion (for related case EP 24191356.5), Jan. 9, 2025, pp. 1-11, European Patent Office, Munich.

Unknown, Determining the number of clusters in a data set, Wikipedia, Online Encylopedia, 8 pages, Mar. 22, 2023, Wikipedia, USA.

Quardri et al., Automatic Scatterplot Design Optimization for Clustering Identification, Arxiv.org, Cornell University Library, Jul. 7, 2022, pp. 1-16, Olin Library Cornell University, Ithaca, USA.

Birunda et al., A Review on Word Embedding Techniques for Text Classification, Innovative Data Communication Technologies and Application, 2021, pp. 267-281, vol. 59, Springer Nature Singapore Ptc Ltd., Singapore.

* cited by examiner 72
72
73-2
73-4
73-1
73-3

62
61
73-2
73-1
73-3
73-4

400
450

500
550

COMPUTING DEVICE, SYSTEM, FRONTEND DEVICE, METHOD AND COMPUTER PROGRAM

CROSS-REFERENCE TO RELATED APPLICATIONS

This application claims priority of German Patent Application No. 10 2023 105 343.4 filed on Mar. 3, 2023, the contents of which are incorporated herein.

TECHNICAL FIELD

The present disclosure relates to a computing device configured to generate output data based on received images of a medical scene. The disclosure also relates to a system comprising such a computing device and a frontend device comprising said system, wherein the frontend device may in particular be a medical instrument. The disclosure further relates to a computer-implemented method for generating output data based on obtained images of a medical scene as well as to a computer program product for executing such a method. The disclosure also generally relates to the reduction of the storage space and bandwidth necessary for storing or transmitting images of a medical scene.

BACKGROUND

Nowadays, more data are being collected than ever before. Many the devices not only perform their original function but also produce and/or record large amounts of data, in particular images. With automated image processing, for example using machine-learning techniques, image data, in particular of medical scenes, offer enormous possibilities for computerized analyses and support for physicians.

A large production of image data comes with the downside that typically a large percentage of the acquired image data will be redundant. The redundant images not only drain time and resources for their analysis and storage, they also do not, as a rule, advantageously contribute to the training of machine-learning algorithms: in general, when monitoring a scene with a camera, it is not the normal state of the scene which is of interest but rather the abnormal state, for example in which a person enters the scene, an object is moved or changed and the like. A large number of identical and redundant images not only requires a lot of labeling but also may skew the training of the machine-learning algorithm towards perfect analysis regarding the large amount of identical images rather than to accurately detect or recognize changes to the normal scene in the remaining images.

In the field of natural language processing, the technique of word embeddings is known in order to quantify the semantical meaning of texts. A review can be found, for example, in “A Review on Word Embedding Techniques for Text Classification” by S. Birunda and R. Devi, 3.2.2021, DOI: 10.1007/978-981-15-9651-3_23.

SUMMARY

The above-described problems are solved by the subject-matter of the independent claims of the present disclosure.

According to a first aspect, the disclosure provides a computing device including: an input interface configured to receive a plurality of images of a medical scene; an image embeddings generating module, IEGM, configured to receive, as its input, the plurality of images and to generate a data array as an image embedding for each image; a clustering module, CLUM, configured to determine a plurality of clusters within the plurality of images based on the generated image embeddings; a replacement determining module, RPDM, configured to determine, for each cluster of the determined plurality of clusters, a replacement image; and an output module, OUTM, configured to generate output data wherein, for each determined cluster, all images of that cluster are replaced with the replacement image for that cluster.

The data array may in particular be a matrix or a vector. The clustering may be performed using any known clustering algorithm. The clustering algorithm may employ a machine-learning model.

The term “medical scene” is used broadly herein: It may refer to a scene in a building dedicated to medical endeavors, for example a medical research institute, a hospital, a medical university, the private practice of a physician, the inside of an ambulance, and an outside or even an inside view of a patient that is currently undergoing or is about to go a medical procedure. On the other hand, a medical scene may also be a scene which has been recorded using a frontend device comprising a camera, wherein the frontend device is a medical instrument such as an endoscope, an exoscope or the like. The medical scene may also be a scene in which a person with a medical capacity such as a physician or a nurse is present, in particular when acting as such.

Advantageously, the clustering module is configured to group the entirety of the plurality of images into clusters. However, in some applications, not all of the images may be grouped into clusters. In other words, there may be images that are not grouped into any cluster, or, equivalently, images that are each grouped into a “cluster of 1”. Preferably, however, at least one cluster, preferably a plurality of clusters (and more preferably each cluster) comprises at least two images each.

Although here, in the foregoing and in the following, some functions are described as being performed by modules, it shall be understood that this does not necessarily mean that such modules are provided as entities separate from one another. In cases where one or more modules are provided as software, the modules may be implemented by program code sections or program code snippets, which may be distinct from one another but which, may also be interwoven.

Similarly, in case where one or more modules are provided as hardware, they functions of one or more modules may be provided by one and the same hardware component, or the functions of one module or the functions of several modules may be distributed over several hardware components which need not necessarily correspond to the modules one-to-one. Thus, any apparatus, system, method and so on which exhibits all of the features and functions ascribed to a specific module shall be understood to comprise, or implement, said module.

In particular, it is a possibility that all modules are implemented by program code executed by a computing device (or: computer), e.g. a server or a cloud computing platform.

The computing device may be realized as any device, or any means, for computing, in particular for executing a software, an app, or an algorithm. For example, the computing device may comprise at least one processing unit such as at least one central processing unit, CPU, and/or at least one graphics processing unit, GPU, and/or at least one field-programmable gate array, FPGA, and/or at least one application-specific integrated circuit, ASIC and/or any combination of the foregoing. The computing device may further comprise a working memory operatively connected to the at least one processing unit and/or a non-transitory memory operatively connected to the at least one processing unit and/or the working memory. The computing device may be implemented partially and/or completely in a local apparatus and/or partially and/or completely in a remote system such as by a cloud computing platform.

Here and in the following, for some (especially longer) terms abbreviations (such as "IEGM" for "image embeddings generating module") are used. Usually, the terms will be given followed by the corresponding abbreviations. In some cases, to improve legibility, only the abbreviation will be used, whereas in other cases only the term itself will be used. In all cases, the term itself and its corresponding abbreviation shall be understood to be equivalent.

According to a second aspect, the present disclosure provides a system comprising the computing device according to any embodiment of the first aspect of the present disclosure. The system may further comprise a camera unit configured to capture the plurality of images. The input interface of the computing device is preferably configured to obtain the plurality of images from the camera unit.

According to a third aspect, the present disclosure provides a front-end device in which the system according to any embodiment of the second aspect is integrated.

According to a fourth aspect, the present disclosure provides a computer-implemented method for reducing image data volumes, comprising: obtaining input data comprising a plurality of images of a medical scene; generating, for each image of the plurality of images, a data array as an image embedding for that image; determining a plurality of clusters within the plurality of images based on the generated image embeddings; determining, for each cluster of the determined plurality of clusters, a replacement image; and generating output data wherein, for each determined cluster, all images of that cluster are replaced with the representative data item of that cluster.

According to a fifth aspect, the disclosure provides a computer program product comprising executable program code configured to, when executed, perform the method according to any embodiment of the fourth aspect of the present disclosure.

According to sixth aspect, the disclosure provides a non-transient computer-readable data storage medium comprising executable program code configured to, when executed, perform the method according to any embodiment of the fourth aspect of the present disclosure.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

According to a seventh aspect, the disclosure provides a data stream comprising, or configured to generate, executable program code configured to, when executed, perform the method according to any embodiment of the fourth aspect of the present disclosure.

Further advantageous variants, options, embodiments and modifications will described with respect to the description and the corresponding drawings as well as in the dependent claims.

In some advantageous embodiments, refinements, or variants of embodiments, the representative determining module, RPDM, is set up such that for at least one cluster (or all clusters) one of the images of said cluster is selectable (or: selected) as the replacement image for said cluster. In this way, the replacement image provides intuitively and quickly understandable information about the content of the entire cluster.

In some advantageous embodiments, refinements, or variants of embodiments, the representative determining module, RPDM, is set up such that for at least one cluster (or all clusters) a pre-stored image is selectable (or: selected) as the replacement image for that cluster. In this way, the display of sensitive or restricted content in the replacement image can be avoided. Moreover, the pre-stored replacement image may provide concise information about the content of the cluster and/or about the reasons for the replacement.

In some advantageous embodiments, refinements, or variants of embodiments, the device further comprises a censoring module, CEM, configured to determine for each cluster whether one of the images of said cluster is to be selected as the replacement image for that cluster or whether a pre-stored image is to be selected as the replacement image. This allows, for example, a censoring in the sense that privacy-protected images can be excluded from the output data.

In some advantageous embodiments, refinements, or variants of embodiments, the clustering module, CLU, is configured to determine the plurality of clusters using a clustering threshold, i.e. a numerical value indicating or influencing how many clusters and/or with how many elements the clusters are generated. The computing device my further comprise a user interface configured to receive a user input pertaining to the clustering threshold, for example a user interface changing the clustering threshold or querying for the currently set clustering threshold. The computing device may be further configured to present to the user an information regarding an effect of said clustering threshold on the data size and/or required bandwidth of the output data. The user interface may comprise a graphical user interface, GUI, which may also be configured to present the user with the information. In this way, the user can control the generation of the clusters in an intuitive way and adapted, or adaptable, to any current situation.

In some advantageous embodiments, refinements, or variants of embodiments, the clustering module, CLUM, performs a hierarchical agglomerative clustering method. In order to visualize image samples, a uniform manifold approximation and projection method may be used, for example in order to present the user with the above-mentioned information using the graphical user interface, GUI.

In some advantageous embodiments, refinements, or variants of embodiments of the front-end device according to the third aspect of the present disclosure, the front-end device comprises an internal data storage. The output module, OUTM may be configured to store the output data in the internal data storage whereas the remaining images (i.e. the images of the original plurality of images which have not been made part of the output data) are discarded. In this way, the internal data storage may be designed smaller, or more relevant output data can be stored within an internal data storage of fixed size.

In some advantageous embodiments, refinements, or variants of embodiments, the output module, OUTM, comprises a transmitter which is configured to transmit the output data to an external receiver whereas the remaining images are discarded or stored locally, for example within the front-end device. In this way, less bandwidth is necessary to transmit the relevant output data.

In some advantageous embodiments, refinements, or variants of embodiments, the front-end device is a medical instrument, in particular an endoscope or an exoscope.

In some advantageous embodiments, refinements, or variants of embodiments of the method of the fourth aspect, the method is performed within a front-end device and further comprises a step of storing the output data within the front-end device while discarding the remaining images.

In some advantageous embodiments, refinements, or variants of embodiments, the method further comprises the step of transmitting the output data to an external receiver while discarding the remaining images.

In some advantageous embodiments, refinements, or variants of embodiments, the method is performed within a front-end device and further comprises a step of transmitting the output data from the front-end device to an external receiver while discarding the remaining images or while storing them within an internal data storage of the front-end device.

In some advantageous embodiments, refinements, or variants of embodiments, the method comprises, after generating the output data according to any of the ways described herein, a further step of annotating, preferably automatically, each replacement image with a label. Optionally, each image that belongs to the cluster for which a replacement image has been determined is then labelled, preferably automatically, with the same label as the replacement image for that cluster. In this case, the method may be designated as a computer-implemented method for generating training data for machine learning.

Further applicability of the present disclosure will become apparent from the following figures, detailed description and claims. However, it should be understood that the detailed description and specific examples, while indicating preferred embodiments of the disclosure, are given by way of illustration only, since various changes and modifications within the spirit and scope of the disclosure will become apparent to those skilled in the art.

BRIEF DESCRIPTION OF THE DRAWINGS

Aspects of the present disclosure will be better understood with reference to the following figures. The components in the drawings are not necessarily to scale, emphasis being placed instead upon clearly illustrating the principles of the present disclosure. Parts in the different figures that correspond to the same elements have been indicated with the same reference numerals in the figures, in which.

The figures are not necessarily to scale, and certain components can be shown in generalized or schematic form in the interest of clarity and conciseness. In some instances, well-known structures and devices are shown in block diagram form in order to avoid obscuring the concepts of the present disclosure.

DETAILED DESCRIPTION OF PREFERRED EMBODIMENTS

Figure 1:
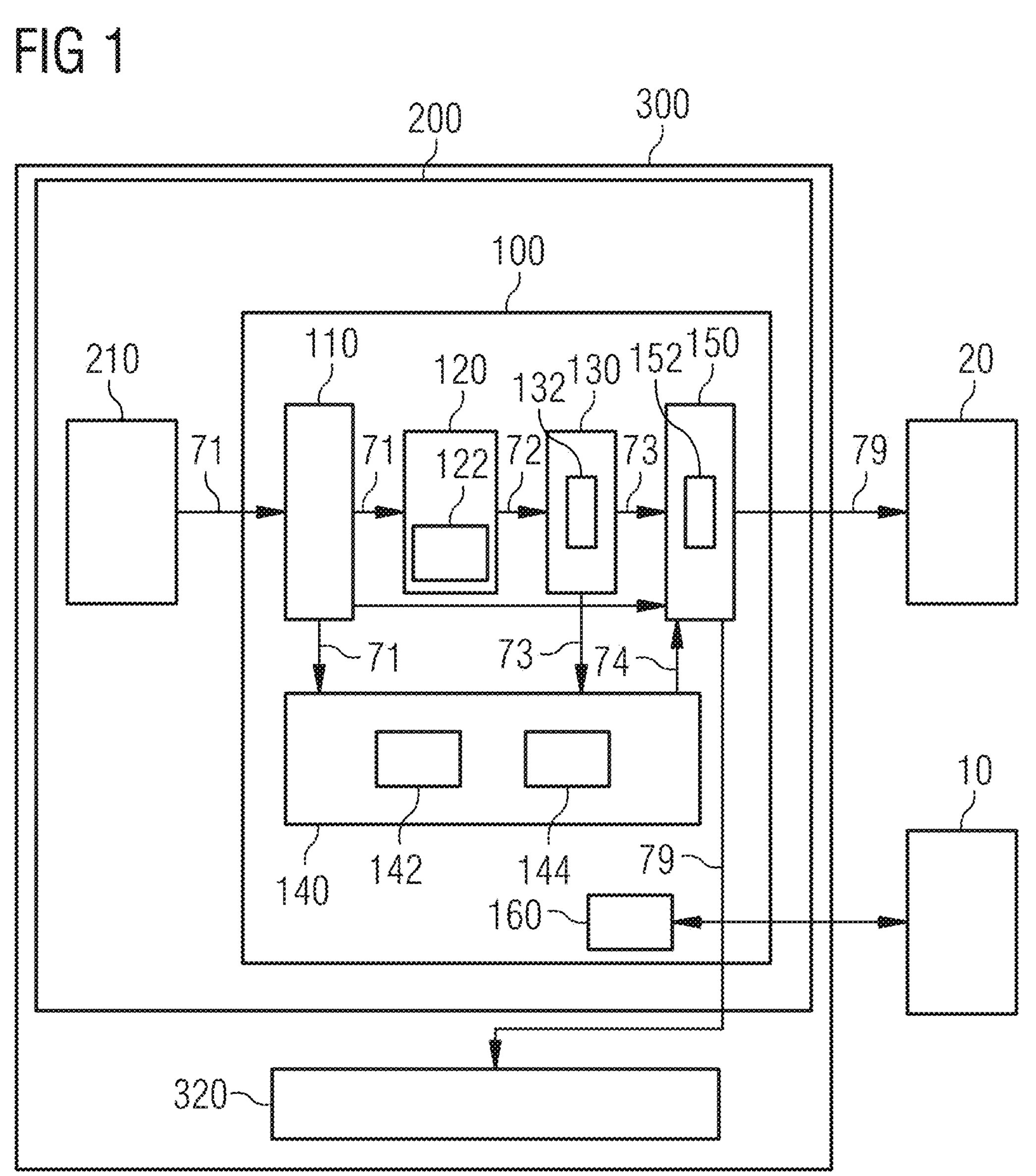
FIG. 1 shows a schematic block diagram for illustrating a computing device according to an embodiment, a system according to another embodiment, and a front-end device according to yet another embodiment of the present disclosure.

FIG. 1 shows a schematic block diagram for illustrating a computing device 100 according to an embodiment of the present disclosure. The computing device 100 comprises an input interface 110 configured to receive a plurality of images 71 of a medical scene. For example, the images 71 may stem from the camera of a medical instrument such as a video endoscope, from a static camera such as a monitoring camera of a hospital room and/or the like. The images 71 may be received by the input interface 110 either in a wireless or a wire-bound manner using any known communication system, network structure, or protocol. As will be described in more detail later, the computing device 100 may be part of another device which also comprises the source of the images 71, in which case the transmission of the images 71 to the input interface 110 will usually be wire-bound.

The computing device 100 further comprises an image embedding generating module, IEGM 120. The IEGM 120 is configured to receive, as its input, the plurality of images 71 and to generate a data array as an image embedding 72 for each image. Similar to the situation of machine-learning algorithms which are used in natural language processing (NLP) to generate word embeddings with numerical entries corresponding to latent features describing the semantic content of corresponding words, the image embedding may be a matrix or, preferably, a vector with numerical entries which correspond to latent features describing the content of an image.

Thus, the image embedding generating module, IEGM 120, may comprise a machine-learning algorithm 122 configured and trained to generate the image embeddings 72 for each of the input images 71. This machine-learning algorithm 122 may be trained in the same way as corresponding machine-learning algorithms are trained to generate word embeddings in the case of natural language processing, NLP. An example for a method and at the same time an architecture of a machine-learning algorithm 122 for generating an image embedding 72 from an image 71 is shown in and described with respect to FIG. 2 in the following.

Figures 2, 3, 4:
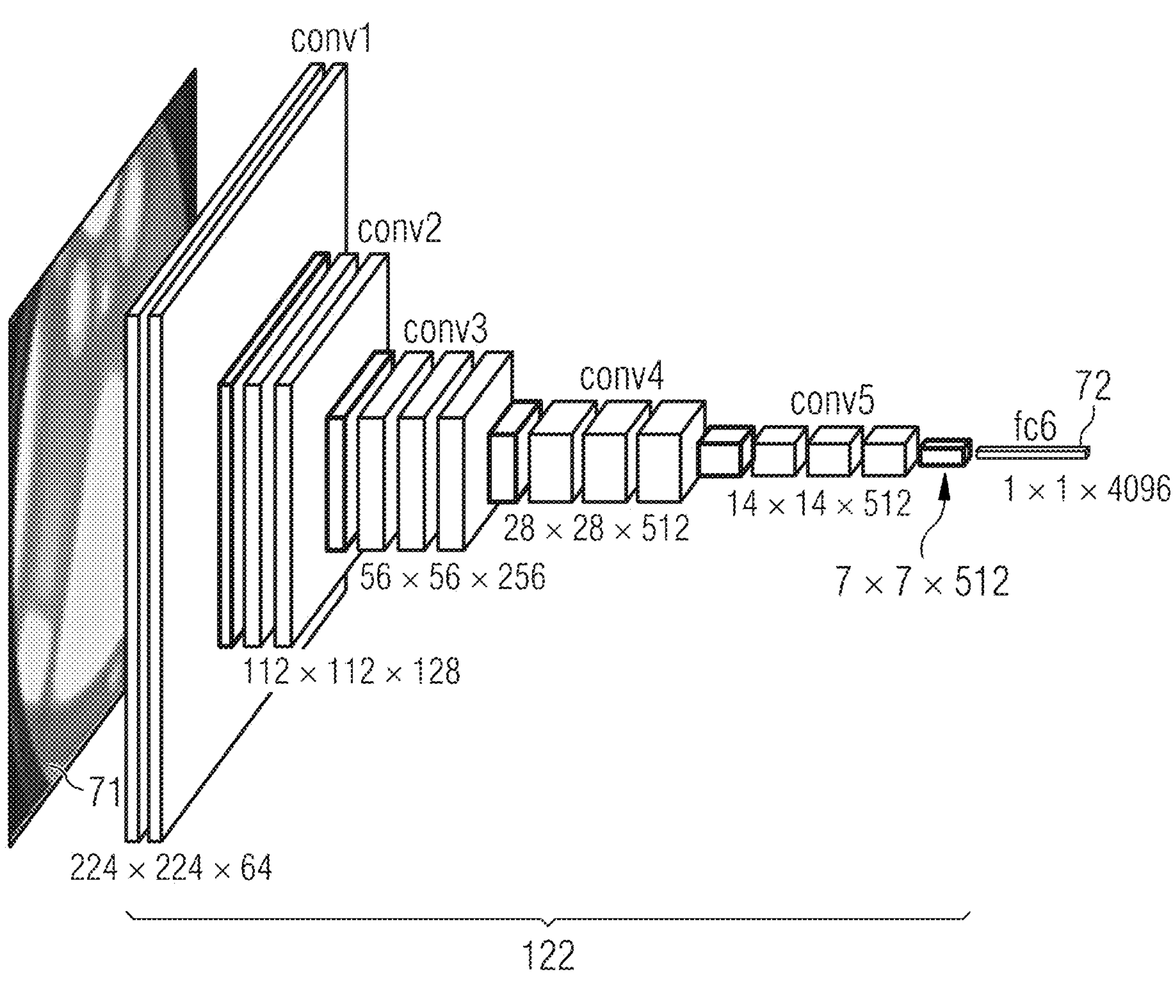
FIG. 2 shows a potential architecture for a machine-learning algorithm for use in any embodiment of the present disclosure.
FIG. 3 is a schematic illustration of image embeddings as dots in a two-dimensional vector space.
FIG. 4 illustrates the clustering method employed by the clustering module described with respect to FIG. 1.

FIG. 2 shows a potential architecture for a machine-learning algorithm 122, illustrated in the known manner by rectangular blocks. In FIG. 2, as an example, the processing of a grayscale input image 71 with 224×224 pixels, each carrying a grayscale value typically between 0 and 255, is illustrated. As is shown in FIG. 2, several convolutional layers conv1 . . . conv5 are applied, each followed by a pooling layer. It shall be understood that also higher or lower numbers of convolutional layers may be provided.

Finally, a fully connected convolutional layer fc6 is applied. In this way, the dimensionality of the original input image 71 of 224×224×1 is transformed to 224×224×64, then to 112×112×128, then to 56×56×256, then to 28×28×512, then to 14×14×512, then to 7×7×512 and finally to 1×1×4096. Thus, the end result is effectively a single vector with 4096 entries which constitutes the image embedding 72 for the input image 71. The same machine-learning algorithm 122 will be applied to each image 71 of the plurality of received images 71 of the medical scene so as to generate a corresponding plurality of image embeddings 72.

Referring to FIG. 1, the computing device 100 also comprises a clustering module, CLUM 130, configured to determine a plurality of clusters 73 within the plurality of images 71 based on the generated image embeddings 72.

The clustering module, CLUM 130, may comprise a distance-calculating module, DICM 132, which is configured to calculate distances between the generated image embeddings 72 according to a predefined distance metric such as a Euclidean metric or the like. Again, it should be understood that in the example of FIG. 2, the predefined metric will be a 4096-dimensional metric. The clustering module, CLUM 130, may be configured to generate the clusters 73 at least partially based on the calculated distances.

Specifically, the clustering module, CLUM 130, may be configured to perform a hierarchical agglomerative clustering method. This method is also known as agglomerative nesting (AGNES) and starts by treating each object (here: image embedding 72) as a singleton cluster. The clustering by the CLUM 130 may also be partially based on the temporal ordering of the images 71, for example based on time stamps of the individual images 71. For instance, when it is important to determine separate phase of the medical scene shown in the plurality of images 71, the CLUM 130 may only be permitted to cluster images 71 together which bear contiguous (possibly with a small tolerance) time stamps. In other variants, where it may be only important to note occurrences within the medical scene regardless of their temporal order, the CLUM 130 may be free to cluster any images 71 at all. In this case, all phases without any movement, for example, may be grouped together in one big cluster.

FIG. 3 and FIG. 4 illustrate the clustering method employed by the clustering module, CLUM 130. FIG. 3 shows a schematic illustration of image embeddings 72 as dots in a two-dimensional vector space. As has been described in the foregoing, typically the vector or data array representing the image embedding 72 will have substantively more entries, for example 4096 entries, as illustrated in FIG. 2. Thus, the parameter space in FIG. 3 would in that case be 4096-dimensional. Here, the two-dimensional illustration is used for ease of understanding.

In this example, 21 image embeddings 72 are depicted. Again, it should be understood that in reality the number of images 71 will typically be much higher than 21. In FIG. 3, the image embeddings 72 have already been visually grouped into three clusters 73-1, 73-2, 73-3, 73-4. FIG. 4 illustrates how the choice of a particular clustering threshold 61, 62 influences the number of clusters being found. A comparatively low clustering threshold such as the clustering threshold 61 in FIG. 4 results in comparatively more clusters of comparatively smaller size, while a comparatively higher clustering threshold such as the clustering threshold 62 in FIG. 4 results in less clusters with typically more items grouped therein.

For example, in the schematic illustration of FIG. 4, raising the clustering threshold from the clustering threshold 61 to the clustering threshold 62 would result in not four but only three total clusters 73, because the first cluster 73-1 and the second cluster 73-2 would be grouped into the same cluster. It is evident from FIG. 4 that an even higher clustering threshold would result in there being only two clusters, because the third cluster 73-3 would also be grouped together with the first and the second cluster 73-1, 73-2.

Conversely, further lowering the clustering threshold from the clustering threshold 61 would eventually result in breaking up the third and/or fourth cluster 73-3, 73-4 into additional, smaller clusters 73. This kind of visualization of the effects of a change in the clustering threshold may help a user to find an appropriate clustering threshold 61, 62, which yields the number of clusters and/or size of clusters which suits the user best. Such a visualization may therefore be provided to a user by a graphical user interface, GUI, as will also be described in more detail in the following.

The clustering threshold 61, 62 may be, alternatively or as a preliminary measure, determined automatically by the clustering module, CLUM 130. For example, criteria such as a minimum and/or maximum number of clusters 73, a minimum and/or maximum number of image embeddings 72 within each cluster 73 and/or the like may be programmed into the CLUM 130. Additionally or alternatively, the user may set (e.g., using the GUI) the clustering threshold 61, 62 either by explicitly choosing a value for it or by setting any of the prescriptions described in the foregoing, i.e. the minimum and/or maximum number of clusters 73 and/or the minimum and/or maximum number of image embeddings 72 within each cluster 73. Further criteria for setting the clustering threshold 61, 62 will become apparent in the following.

Returning to FIG. 1, the computing device 100 comprises a replacement determining module, RPDM 140, which is configured to determine, for each cluster 73 of the determined plurality of clusters 73, a replacement image 74.

The computing device 100 further comprises an output module, OUTM 150, which is configured to generate output data 79. In the output data 79, for each cluster 73, all images 71 of said cluster 73 are replaced by the replacement image 74 for said cluster 73. In other words, the number $N_{71}$ of the images 71 will be reduced to the generally smaller number $N_{73}$ of clusters 73, because the output data 79 will comprise a single (replacement) image 74 for each cluster 73.

The output module, OUTM 150, may comprise a transmitter 152 which is configured to transmit the output data 79 to an external receiver 20, while the remaining images 71 are discarded. For example, the computing device 100 may comprise a working memory for storing the images 71 for processing (clustering etc.) from which the images 71 are deleted after the replacement images 74 have been determined. In cases where the images 71 are generated/captured/obtained continuously or periodically, the process of clustering the images 71 and generating the output data 79 may be performed regularly (for example always after a certain number of images 71 has accumulated in the working memory) and/or periodically (for example whenever after a certain time period has passed).

Several variants for determining a replacement image 74 have been found to be advantageous. Any individual computing device 100 according to any embodiment of the present disclosure can be set up such that the same method for determining the replacement images 74 is used for all clusters, or it may be set up in such a way that it is possible that for each cluster a different method for choosing a replacement image 74 is applicable or selectable. Which method is used in each case may be dependent on the contents of the clusters 73, the number of clusters 73, and/or further internal or external conditions of which a few will be described in the following.

One option is that the replacement determining module, RPDM 140, is set up such that for at least one cluster 73, one of the images 71 of said cluster 73 is selectable (or: selected) as the replacement image 74 for said cluster 73. As an example, in the following the variant will be briefly described in which the RPDM 140 is set up such that for each cluster 73, one of the images 71 of said cluster 73 is selectable as the replacement image 74 for said cluster 73.

Thus, according to this option, the entirety of the images 71 of each cluster 73 will be replaced in the output data 79 by one replacement image 74 for said cluster 73. This replacement image 74 may also be designated as a "representative image" since it represents the other images 71 of the same cluster 73. This representative image can, in turn, be determined according to a number of methods.

According to a simple option, it may be chosen at random from the corresponding cluster 73: since the clustering ensures that the image 71 of the same cluster 73 are quite similar or even identical in content, it may not matter which image 71 thereof is chosen as the replacement image 74.

According to another option, the replacement image may be that image 71 which has an image embedding 72 which comes closest (according to the same, or a different, distance metric as used in the CLUM 130) to an average image embedding of the same cluster 73. The average image embedding has, as its entry in each dimension, the average of the entries of all image embeddings 72 in the same cluster 73 in the same dimension. Here the reasoning is that the image 71 with the image embedding 72 closest to the average image embedding will comprise, in a sense, an average of the content of all of the images 71 in the same cluster 73.

Another option may be to choose that image 71 as the replacement image 74 which has the image embedding 72 with the lowest sum of (Euclidean, or squared, etc.) distances to all of the other image embeddings 72 of the same cluster 73, or which has the lowest cumulative (Euclidean, or squared, etc.) distance to the other image embeddings 72 of the same cluster 73. This may prevent outliers from overly influencing the choice of the replacement image 74.

Of course, other methods and combinations of different methods for determining the replacement image 74 for each cluster 73 may be applied. The rationale behind choosing one of the images 71 of a cluster 73 as the replacement image 74 for said cluster 73 is that the images 71 grouped within one cluster 73 will be comparatively similar simply due to them being grouped within one and the same cluster 73.

The net information loss to a user or to any post-processing step, which occurs due to the leaving-out of the other images 71 from the output data 79, will therefore be comparatively small or may even be zero. For example, when the images 71 stem from a monitoring camera, for a large amount of time they may be showing an empty room without any movement. Therefore, a large number of images 71 that are essentially or completely identical will be generated without any benefit to a user or, for example, to a system configured to analyze the contents of the images 71.

Figure 5:
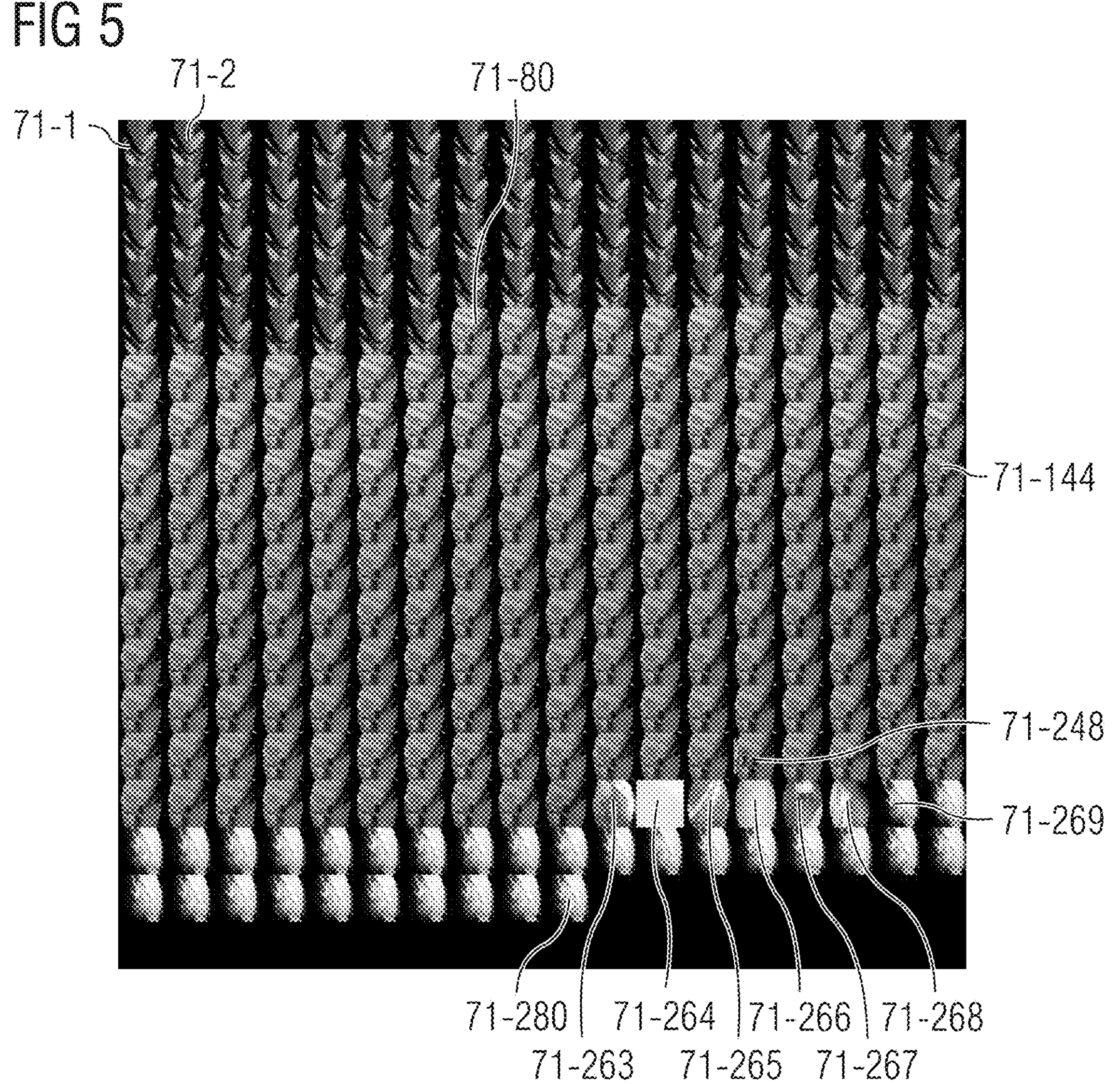
FIG. 5 illustrates a schematic representation of a plurality of images of a medical scene.
Figure 6:
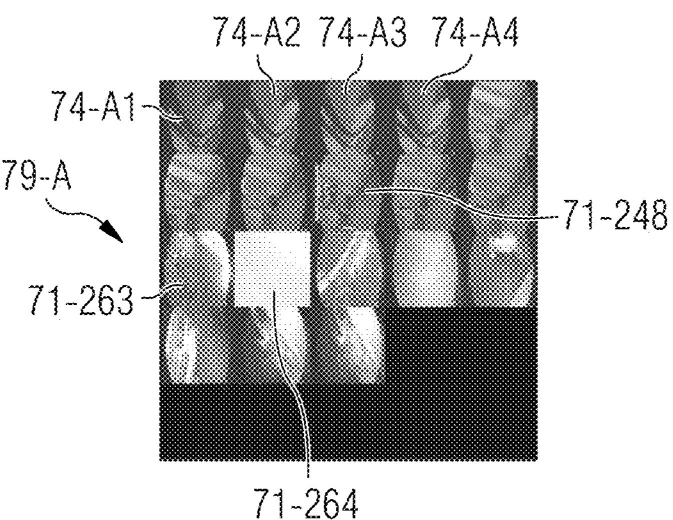
FIG. 6 shows a visual representation of the output data based on the images of FIG. 5.
Figure 7:
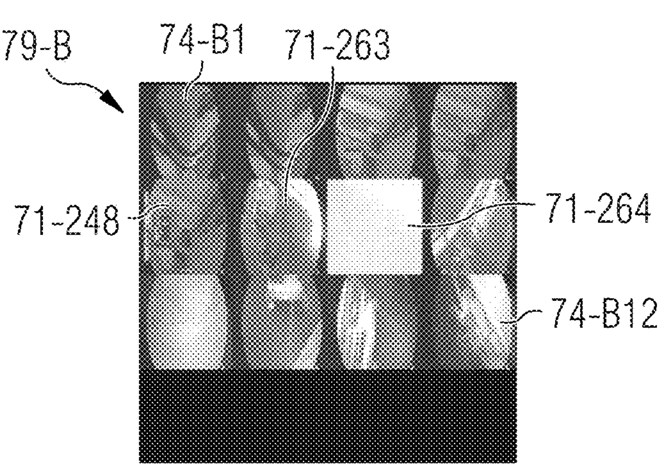
FIG. 7 shows another visual representation of the output data based on the images of FIG. 5.

The procedure according to this variant will be further described with respect to FIG. 5, FIG. 6 and FIG. 7. FIG. 5 shows, in miniaturized form, 280 images 71, labeled and numbered from 71-1, 71-2, . . . , 71-280. The numbering of the labels corresponds to a temporal order in which these images 71-*i* were taken by one particular video camera. As is evident from FIG. 5, the first 79 images from 71-1 to 71-79 show, at least to the human eye, essentially the same content. The same is true for the images from 71-80 to 71-144, and for the images from 71-145 to 71-262. The following images seem to be unique until, from 71-269 to 71-280 the images seem to be largely the same again.

It is thus intuitively evident how the output data 79 output by the computing device 100 of the present disclosure, in particular of FIG. 1, will roughly be grouping the input images 71-1 . . . 71-280.

FIG. 6 and FIG. 7 each show a visual representation of the output data 79, wherein in each figure a different clustering threshold has been used by the clustering module, CLUM 130.

This results, in FIG. 6, in the formation of 18 different clusters 73 such that the output data 79-A in FIG. 6 consist of corresponding 18 replacement images 74-*i*, one for each formed cluster 73.

By contrast, in the situation illustrated by FIG. 7, a comparatively higher clustering threshold has been applied such that not 18 but only 12 clusters 73 have been determined by the clustering module, CLUM 130, and therefore, the output data 79-B in FIG. 7 consist of only 12 replacement images 74-*i*.

Both in FIG. 6 and FIG. 7, some individual images 71-*i* have been labeled for an easier comparison with the corresponding images 71-*i* in FIG. 5. Intuitively, in this case, the method used to create the output data 79-B seems, at least for the human eye, to be more suitable since they contain less redundancy. For example, the first four replacement images 74-A1, 74-A2, 74-A3, 74-A4 seem largely identical to the human eye, whereas out of the entire number of input images 71-1 to 71-79, in the output data 79-B of FIG. 7 only two replacement images 74-B1, 74-B2 have been included. In another clustering scheme and/or using a higher clustering threshold, only a single one of these to images might be provided.

It is thus evident by comparing, for example, FIG. 5 with FIG. 7, how a human user with the task of inspecting the camera images 71-1 . . . 71-280 is confronted with a much smaller workload when working with the result shown in FIG. 7.

Of course, depending on the intended use of the output data 79, there may be a large difference in what kind of clustering is optimal. For example, machine-learning algorithms for analyzing images may determine the two images 74-B1 and 74-B2 to be vastly different.

For instance, it may be the case that the images 71-*i* are intended to be used for training a machine-learning algorithm 122 for determining objects in view of the camera or for determining whether an anomalous state is shown in an image 71-*i* or the like.

As another example, a machine-learning algorithm 122 could be trained to learn whether the scene of a particular room, for example an anesthesia recovery room in a hospital, shows a standard situation such as a patient therein sleeping, or shows an anomalous situation such as at least one patient having a seizure.

In order to train such a machine-learning algorithm 122, typically annotated (or: labeled) images are used such that supervised learning can be performed. In order to determine the labels for the training images, usually a human user has to label each of the images according to the desired determination at which the finished and trained machine-learning algorithm 122 should arrive for said image.

It is evident how the computing device 100 of the present disclosure, or the present disclosure in general, can drastically lower the effort involved with the labeling: In one option, only the replacement images 74-*i* comprised by the output data 79 have to be labeled by the user. Comparing again FIG. 5 and FIG. 7, this would mean labeling 12 images 74-*i* instead of 280 images 71-*i*. Then, depending on the desired application, training method, and outcome, either only the 12 replacement images 74-B1, 74-B2, . . . , 74-B12, then labeled, are used as training data. Or, alternatively, all of the images 71-1 . . . 71-280 are used as training data and each image 71-*i* in each cluster 73 is labeled with the same label that the user has given the replacement image 74-B1, . . . , 74-B12 for that particular cluster 73. This is a very efficient way to provide labelled training data with few labelling steps which may still seem quite different to a machine-learning algorithm.

Another option that can be applied to one or more clusters 73 is that a pre-stored image is selectable (or: selected) as the replacement image 74 for said cluster 73. This variant may be used, for example, in combination with a censoring module, CEM 142, as part of the replacement determining module, RPDM 140, as shown as an option in FIG. 1.

The censoring module, CEM 142, may be configured to determine for each cluster 73 whether one of the images 71 of said cluster is to be selected as the replacement image 74 (for example as has been described in the foregoing) for said cluster 73 or whether a pre-stored image is to be selected as the replacement image 74. For example, the CEM 142 may be configured to determine the presence, within any of the images 71, of an entity such as a person or an object which should not be present in the output data 79. The presence of such an undesired entity within one of the images 71 of one cluster 73 may have the effect that the CEM 142 determines that a pre-stored image is to be selected as the replacement image 74 for said cluster 73.

For example, current regulations such as the European General Data Protection Regulation, GDPR, place strong emphasis on the privacy of patients. It is therefore generally undesired to show the faces or any other features that may help to identify a patient within monitoring images, training images or the like.

Thus, the censoring module, CEM 142, may be configured to determine the presence of such features within any of the images 71 within a cluster 73. Instead of then choosing one of the images 71 of said cluster 73 as replacement image 74 which would have a high chance of containing the undesired feature therein, the pre-stored image may be selected. In this specific example, the pre-stored image may be simply an otherwise empty image with the text "censored", "denied for privacy reasons" and/or the like.

Thus, in the output data 79, there may be a mixture of representative images as replacement images 74 and pre-stored images which indicate to the user that an undesired object was present in one of the images 71 of the corresponding cluster 73. In more complex variants, the pre-stored image may be selected out of a list of pre-stored images, wherein the selection of the pre-stored image to be selected as replacement image 74 may indicate a reason why the censoring module, CEM 142, has decided that a pre-stored image should be selected.

For example, one pre-stored image may carry the text "person present", another the text "personal data visible", another the text "nudity" and so on.

In other variants, there may not be a censoring module, CEM 142, at all, and the replacement determining module, RPDM 140, may be set up such that for each cluster 73, a pre-stored image is selected (instead of a replacement image from within). The pre-stored images in this case may be selected out of a list of pre-stored images that describe the content of the images 71 of said cluster 73 or the like.

For example, the replacement determining module, RPDM 140, may comprise a recognition module, RCGM 144, configured to recognize entities within the images 71, usually based on a list of possible entities. For each such entity, a pre-stored image may be provided which shows an archetypical representation of said entity or the entity's designation in text or the like. Thus, the output data 79 may comprise, for each cluster, a replacement image 74 which quickly informs the user viewing the output data 79 about which entity is visible in each of the clusters 73.

The recognition module 144 may employ a machine-learning algorithm 122, in particular a machine-learning model, preferably an artificial intelligence entity, more preferably an artificial neural network. Similarly, also in the event that the censoring module, CEM 142, is provided as has been described in the foregoing, the pre-stored image selected by the CEM 142 in some cases may be chosen out of a similar list of pre-stored images which conform to entities recognizable by the recognition module RCGM 144. Typically, the identity of entities is determined using a softmax function step towards the end of an artificial neural network.

The computing device 100 may further comprise a user interface 160 (e.g. implementing a graphical user interface, GUI) configured to receive, by a user, a user input pertaining to the clustering threshold 61, 62. The user interface 160 may further be configured to present to the user information regarding an effect of said clustering threshold 61, 62 on the data size and/or required bandwidth of the output data 79. In this way, the user may set the clustering threshold 61, 62 manually in such a way as to obtain a desired minimum and/or maximum data size, a minimum and/or maximum required bandwidth and/or the like.

The user interface 160 may be implemented, for example, as a software interface connectable to an application run on a device 10 of a user.

Alternatively, the computing device 100, in particular the clustering module, CLUM 130, may be configured such as to determine the clusters 73 such as to result in a minimum/maximum data size and/or minimum/maximum required bandwidth of the output data 79. To this end, the clustering module, CLUM 130, the replacement determining module, RPDM 140, and the output module, OUTM 150, may work in a loop until a suitable clustering threshold has been found and the generated output data 79 have the desired properties.

As has been described before, in addition, or alternatively, the user may also be able to choose additional parameters such as the minimum/maximum number of clusters 73, the minimum/maximum number of image embeddings 72 within each cluster 73 and/or the like. The graphical user interface, GUI, may comprise, for example, a structure as it is shown in FIG. 4 wherein the user 1 may be able to shift the dashed line indicating the value of the clustering threshold 61, 62 such as to obtain the desired result. The GUI may comprise a touchscreen so that the user may simply touch and move the line or may contain a keyboard for entering a value or up/down buttons for shifting the line and/or the like. The representation as shown in FIG. 3 may be generated using a Uniform Manifold Approximation and Projection Method.

FIG. 1 also schematically illustrates a system 200 according to another embodiment of the present disclosure. The system 200 comprises the computing device 100 according to any embodiment of the present disclosure. The system 200 further comprises a camera unit 210 configured to capture the plurality of images 71. The input interface 110 is configured to obtain the plurality of images 71 from the camera unit 210, either wireless or, preferably, in a wire-bound way.

FIG. 1 also illustrates a frontend device 300 according to another embodiment of the present disclosure. The system 200 is integrated into the frontend device 300, in particular in such a way that they are comprised by one and the same physical housing. For example, the frontend device 300 may be a monitoring camera with a housing, in which both the computing device 100 and the actual camera unit 210 are integrated.

In preferred variants, the frontend device 300 is a medical instrument in which the camera unit 210 is integrated, more preferably an endoscope (or: video endoscope) or exoscope. Traditional frontend devices of the prior art which comprise camera units usually deal with the captured (or: acquired) images in one of two ways: Either the images are stored in an internal data storage of the frontend device or the images are transmitted to an external receiver. In both cases, according to the prior art, the total data size of the images is large and therefore either a large internal data storage is necessary, a high bandwidth is necessary for transmitting the data, large external data storages are necessary, and/or some (usually the oldest) images are lost when the internal data storage runs full and images are overwritten in order to make room for the newly captured images.

The present disclosure improves both of these variants: In case the frontend device 300 comprises an internal data storage 320, the output module, OUTM 150, may be configured to store the output data 79 in the internal data storage 320, whereas the remaining images 71 are discarded. Referring back to the comparison between FIG. 5 and FIG. 7, for example, it is evident how either images 71 referring to many more clusters 73 can be stored within an internal data storage 320 of given size compared to the prior art, or a small internal data storage 320 as compared to the prior art can be installed within the frontend device 300. The discarding of the remaining images 71 may simply mean that the remaining images 71 are deleted. This may happen immediately after the replacement image 74 for each cluster 73 is determined to all images 71 of said cluster 73.

In the other variant, the output module, OUTM 150, may comprise a transmitter 152 which is configured to transmit the output data 79 to an external receiver 20 whereas the remaining images 71 (not part of the output data 79) are discarded or stored locally within the frontend device 300, for example within the internal data storage 320. Depending on the requirements of this specific application, in this way it can be ensured that only relevant (in particular: non-redundant or low-redundancy) images are transmitted when the bandwidth of the transmission and/or attention span or data storage of the external receiver 20 are limited. The images 71 can optionally be stored locally within the frontend device 300 in case that the internal data storage 320 is large, or they can be discarded in case it is not or in case the remaining images 71 are of no importance.

Figures 8, 9, 10:
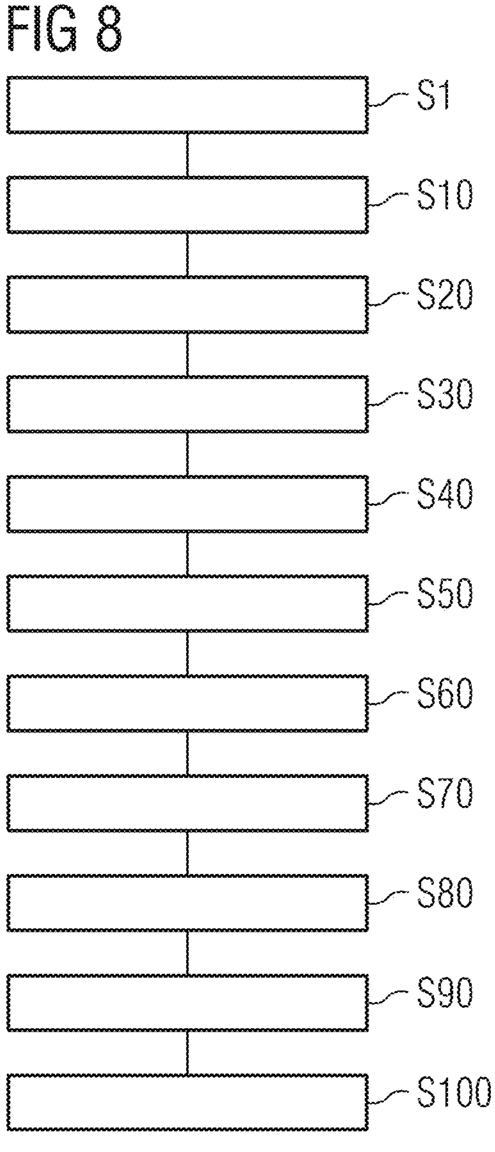
FIG. 8 shows a schematic flow diagram illustrating a method according to an embodiment of the present disclosure.
FIG. 9 shows a schematic block diagram illustrating a computer program product according to another embodiment of the present disclosure.
FIG. 10 shows a schematic block diagram illustrating a data storage medium according to yet another embodiment of the present disclosure.

FIG. 8 shows a schematic flow diagram illustrating a method for reducing image data volumes according to an embodiment of the present disclosure. The method of FIG. 8 may be performed using any of the computing devices, systems, or front-end devices according to any embodiments of the present disclosure, in particular as described with respect to FIG. 1, but also independently. Any variants, options, embodiments, advantages, and refinements, described for any computing device, system, or front-end device described herein may also be applied to the present method and vice versa.

In a step S10, input data comprising a plurality of images 71 of a medical scene are obtained, for example, as has been described in the foregoing with respect to the input interface 110. In particular, the input images 71 may be captured, in a step S1, by a video camera, for example the video camera 210 of the system 200 and/or of the front-end device 300.

In a step S20, for each image 71 of the plurality of images 71, a data array is generated as an image embedding 72 for that image, in particular as has been described with respect to the image embeddings generating module, IEGM 120, in the foregoing.

In a step S30, a plurality of clusters 73 within the plurality of images 71 are determined based on the generated image embeddings 72, in particular as has been described in the foregoing with respect to the clustering module, CLUM 130, in the foregoing.

In a step S40, for each cluster 73 of the determined plurality of clusters 73 a replacement image 74 is determined, in particular as has been described with respect to the replacement determining module, RPDM 140, in the foregoing. Specifically, the replacement image 74 may be one of the images 71 of said cluster 73, or it may be a pre-stored image. In any particular embodiment of the method, for all clusters one of the images 71 may be chosen as a replacement image 74, or for all clusters a pre-stored image may be chosen as a replacement image 74, or it may be determined for each cluster 73, whether one of the images 71 therein or a pre-stored image is chosen as the replacement image 74 therefor. Several options and variants have been described with respect to the censoring module, CEM 142, together with corresponding advantages in the foregoing.

In a step S50, output data 79 are generated wherein, for each determined cluster 73, all images 71 of that cluster are replaced with the replacement image 74 of that cluster, in particular as has been described in the foregoing with respect to the output interface 150. The output data 79 may be transmitted to an external receiver 20 and/or stored within an internal data storage 320 of a front-end device 300 in which the method is executed and/or the like. Several options and variants, together with corresponding advantages, have been described in the foregoing.

Thus, when the method is executed (or performed) within a front-end device 300, the method may comprise a step S60 of storing the output data 79 within the front-end device 300 (for example in the internal data storage 320) while discarding the remaining images 71, for example deleting them.

Additionally, or alternatively, the method may comprise a step S70 of transmitting the output data 79 to an external receiver 20 while discarding the remaining images 71. The term “external” here may refer to a device external to the one in which the present method is executed, for example computing device 100, system 200 or front-end device 300. Other alternatives have already been described in the foregoing as well, for example the option that only the output data 79 are transmitted to the external receiver 20 but that the remaining images 71, or all images 71 (including the ones present in the output data 79) are stored within the device 100, system 200 or front-end device 300, e.g. the internal data storage 320. In general, step S60 and S70 will be mutually exclusive.

In some cases, the original images 71 may be transmitted along with the output data 79. In this case, there is no immediate saving of bandwidth or data storage space, but a user may evaluate the output data 79 together with the images 71. Using e.g. a graphical user interface, the user may inspect the clusters and confirm or reject the decision made when determining the replacement images 74, or manually overrule said determination. For example, using a picture browser the user may be able to change the image 71 selected as the replacement image 74 for at least one cluster 73. Then, the finally approved output data 79 may be further processed (transmitted, stored or the like) so that at that point the reduction in bandwidth and storage space occurs.

If the determining S30 of the clusters 73 is based, among other parameters, on a clustering threshold 61, 62, the method may comprise a step S80 of receiving a user input pertaining to the clustering threshold 61, 62, and a step S90 of presenting to the user an information regarding an effect of said clustering threshold 61, 62 on the data size and/or required bandwidth of the output data 79. As has been described in the foregoing in particular with respect to the user interface 160, the input of the user may be used to dynamically calculate (or re-calculate) the data size, bandwidth and the like (which will usually require performing at least steps S30, S40 and S50 again), and to present the result to the user in real time, for example using a graphical user interface.

In some variants, after the output data 79 are generated S50 as described herein, in a step S100 each replacement image 74 is labeled, preferably automatically. Options and variants have already been described in the foregoing. Thereafter, the labelled output data 79 may be used as training data for training a machine learning algorithm, preferably an artificial intelligence entity, more preferably an artificial neural network, most preferably a convolutional deep neural network.

FIG. 9 shows a schematic block diagram illustrating a computer program product 400 according to an embodiment of the fifth aspect of the present disclosure. The computer program product 400 comprises executable program code 450 configured to, when executed, perform the method according to any embodiment of the fourth aspect of the present, in particular as has been described with respect to the preceding figures.

FIG. 10 shows a schematic block diagram illustrating a non-transitory computer-readable data storage medium 500 according to an embodiment of the sixth aspect of the present disclosure. The data storage medium 500 comprises executable program code 550 configured to, when executed, perform the method according to any embodiment of the fourth aspect of the present, in particular as has been described with respect to the preceding figures.

The non-transient computer-readable data storage medium may comprise, or consist of, any type of computer memory, in particular semiconductor memory such as a solid-state memory. The data storage medium may also comprise, or consist of, a CD, a DVD, a Blu-Ray-Disc, an USB memory stick or the like.

As has been described in the foregoing, embodiments may be based on using a machine-learning model or machine-learning algorithm. Machine learning may refer to algorithms and statistical models that computer systems may use to perform a specific task without using explicit instructions, instead relying on models and inference.

For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model.

The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta-data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training.

Besides supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range).

Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated.

Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms.

For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another.

The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories.

The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The previous description of the disclosed embodiments are merely examples of possible implementations, which are provided to enable any person skilled in the art to make or use the present disclosure. Various variations and modifications of these embodiments will be readily apparent to those skilled in the art, and the generic principles defined herein may be applied to other embodiments without departing from the spirit or scope of the present disclosure.

Thus, the present disclosure is not intended to be limited to the embodiments shown herein but it is to be accorded the widest scope consistent with the principles and novel features disclosed herein. Therefore, the present disclosure is not to be limited except in accordance with the following claims.

The invention claimed is:

1. A computing device comprising:

an input interface configured to receive a plurality of images of a medical scene;

an image embeddings generating module configured to receive, as its input, the plurality of images and to generate a data array as an image embedding for each image;

a clustering module configured to determine a plurality of clusters within the plurality of images based on the generated image embeddings;

a replacement determining module configured to determine, for each cluster of the determined plurality of clusters, a replacement image; and an output module configured to generate output data wherein, for each determined cluster, all images of that cluster are replaced with the replacement image for that cluster.

2. The computing device of claim 1, wherein the replacement determining module is set up such that for at least one cluster one of the images of said cluster is selectable as the replacement image for said cluster.

3. The computing device of claim 1, wherein the replacement determining module is set up such that for at least one cluster a pre-stored image is selectable as the replacement image for that cluster.

4. The computing device of claim 2, further including a censoring module configured to determine for each cluster whether one of the images of said cluster is to be selected as the replacement image for that cluster or whether a pre-stored image is to be selected as the replacement image.

5. The computing device of claim 1, wherein the clustering module is configured to determine the plurality of clusters using a clustering threshold;

the computing device further including a user interface configured to receive a user input pertaining to the clustering threshold, and further configured to present to the user an information regarding an effect of said clustering threshold on the data size and/or required bandwidth of the output data.

6. The computing device of claim 1, wherein the clustering module includes a distance calculating module configured to calculate distances between the generated image embeddings according to a predefined distance metric, and wherein the clustering module is configured to generate the clusters at least partially based on the calculated distances.

7. The computing device of claim 6, wherein the clustering module performs a hierarchical agglomerative clustering method.

8. A system comprising:

the computing device of claim 1; and a camera unit configured to capture the plurality of images, and wherein the input interface is configured to obtain the plurality of images from the camera unit.

9. A front-end device in which the system of claim 8 is integrated.

10. The front-end device of claim 9, wherein the front-end device includes an internal data storage; and wherein the output module is configured to store the output data in the internal data storage whereas the remaining images are discarded.

11. The front-end device of claim 9, wherein the output module includes a transmitter which is configured to transmit the output data to an external receiver whereas the remaining images are discarded or stored locally within the front-end device.

12. The front-end device of claim 9, wherein the front-end device is a medical instrument.

13. A computer-implemented method for reducing image data volumes, comprising:

obtaining input data including a plurality of images of a medical scene;

generating, for each image of the plurality of images, a data array as an image embedding for that image;

determining a plurality of clusters within the plurality of images based on the generated image embeddings;

determining, for each cluster of the determined plurality of clusters, a replacement image; and generating output data wherein, for each determined cluster, all images of that cluster are replaced with the replacement image of that cluster.

14. The method of claim 13, the method being performed within a front-end device and further including the step of:

storing the output data within the front-end device while discarding the remaining images.

15. The method of claim 13, further including the step of:

transmitting the output data to an external receiver while discarding the remaining images.

16. The method of claim 13, wherein the step of determining the clusters is based on a clustering threshold further includes the step of:

receiving a user input pertaining to the clustering threshold; and presenting to the user an information regarding an effect of said clustering threshold on the data size and/or required bandwidth of the output data.

17. A computer-implemented method for generating training data for machine learning, comprising:

generating the output data according to claim 13, and annotating, preferably automatically, each replacement image with a label.

18. A computer program product comprising executable program code configured to, when executed, perform the method of claim 13.

19. A non-transitory, computer-readable data storage medium comprising executable program code configured to, when executed, perform the method of claim 13.

* * * * *